United States Patent
Eser et al.

(10) Patent No.: US 9,046,042 B2
(45) Date of Patent: Jun. 2, 2015

(54) METHOD AND DEVICE FOR CONTROLLING A VARIABLE VALVE TRAIN OF AN INTERNAL COMBUSTION ENGINE

(75) Inventors: Gerhard Eser, Hemau (DE); Torsten Geiss, Regensburg (DE); Steffen Gessner, Regensburg (DE); Simon Message, Regensburg (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 87 days.

(21) Appl. No.: 14/110,306

(22) PCT Filed: Mar. 8, 2012

(86) PCT No.: PCT/EP2012/053976
§ 371 (c)(1),
(2), (4) Date: Nov. 22, 2013

(87) PCT Pub. No.: WO2012/136438
PCT Pub. Date: Oct. 11, 2012

(65) Prior Publication Data
US 2014/0090614 A1      Apr. 3, 2014

(30) Foreign Application Priority Data

Apr. 5, 2011   (DE) .................. 10 2011 006 752

(51) Int. Cl.
| | |
|---|---|
| *F01L 1/34* | (2006.01) |
| *F02D 13/02* | (2006.01) |
| *F02B 23/10* | (2006.01) |
| *F02D 41/00* | (2006.01) |
| *F02D 41/14* | (2006.01) |
| *F02D 41/22* | (2006.01) |

(52) U.S. Cl.
CPC .......... *F02D 13/0207* (2013.01); *F02B 23/101* (2013.01); *F02D 41/0002* (2013.01); *F02D 41/0085* (2013.01); *F02D 41/1498* (2013.01); *F02D 41/221* (2013.01); *Y02T 10/18* (2013.01)

(58) Field of Classification Search
CPC ............ F02D 13/0207; F02D 41/0085; F02D 41/0002; F02B 23/101
USPC ................................ 123/90.15, 90.16, 90.17
See application file for complete search history.

(56) References Cited

U.S. PATENT DOCUMENTS

| | | | |
|---|---|---|---|
| 6,739,295 B1 * | 5/2004 | Yamaoka et al. .......... | 123/90.15 |
| 6,837,231 B1 | 1/2005 | Herrin ........................... | 123/684 |
| 2007/0074705 A1 | 4/2007 | Nakasaka et al. ............. | 123/478 |

FOREIGN PATENT DOCUMENTS

| | | | | |
|---|---|---|---|---|
| DE | 3833465 A1 | 4/1990 | ............. | F02D 35/02 |
| DE | 10000872 A1 | 7/2001 | ............. | F02D 33/02 |

(Continued)

OTHER PUBLICATIONS

International Search Report and Written Opinion, Application No. PCT/EP2012/053976, 9 pages, Jun. 1, 2012.

*Primary Examiner* — Zelalem Eshete
(74) *Attorney, Agent, or Firm* — King & Spalding LLP (57) ABSTRACT

A method is disclosed for controlling a variable valve timing mechanism of an internal combustion engine having a plurality of cylinders, wherein, at a first operating point of the internal combustion engine, the fuel quantity which is fed in in each case is reduced successively for each cylinder until a predetermined unsmooth-running limiting value is reached. The variable valve timing mechanism is controlled with consideration of the cylinder-individual values for the fuel-quantity reduction at the first operating point.

18 Claims, 3 Drawing Sheets

(56) References Cited

FOREIGN PATENT DOCUMENTS

| DE | 10156409 A1 | 6/2003 | ............ F02D 41/00 |
| DE | 102004031691 A1 | 2/2005 | ............ F02D 41/00 |
| EP | 0833043 A1 | 4/1998 | ............ F02B 75/20 |
| EP | 1431557 A2 | 6/2004 | ............ F02D 41/00 |
| WO | 2012/136438 A1 | 10/2012 | ............ F02D 13/02 |

* cited by examiner

METHOD AND DEVICE FOR CONTROLLING A VARIABLE VALVE TRAIN OF AN INTERNAL COMBUSTION ENGINE

CROSS-REFERENCE TO RELATED APPLICATIONS

This application is a U.S. National Stage Application of International Application No. PCT/EP2012/053976 filed Mar. 8, 2012, which designates the United States of America, and claims priority to DE Application No. 10 2011 006 752.3 filed Apr. 5, 2011, the contents of which are hereby incorporated by reference in their entirety.

TECHNICAL FIELD

This disclosure relates to a method and a device for controlling a variable valve train of an internal combustion engine having a plurality of cylinders.

BACKGROUND

During efforts to reduce further the fuel consumption and the emissions of pollutants of modern internal combustion engines, internal combustion engines with a variable valve train are being increasingly used for performing the variable control of the inlet valves and/or outlet valves. In this context, internal combustion engines with variable valve stroke control and/or variable control of the valve opening times prove particularly efficient since they can be operated virtually without throttling (throttle valve fully opened) in the lower and medium load ranges. In this context, the load control is carried out exclusively by means of the stroke and/or the opening times of the inlet valves. In this operating range without throttling, the charge cycle losses are low, which results in reduced consumption. However, fabrication-related tolerances of the valve train and of the valves give rise to faults during the charging of the cylinders. In particular in the lower load range and in the idling mode, where the strokes and/or the opening times of the inlet valves are very small in the non-throttled operating mode, even small faults during the charging of the cylinders can be manifest as perceptible differences in torque, which restricts the driving comfort. These differences in torque, which can occur not only between different internal combustion engines but also between the cylinders of the same internal combustion engine, give rise in the worst case to perceptible unsmooth running in the lower load range or in the idling mode and therefore restrict the driving comfort.

SUMMARY

One embodiment provides a method for controlling a variable valve train of an internal combustion engine having a plurality of cylinders, wherein at a first operating point of the internal combustion engine the fuel quantity which is fed in in each case is reduced successively for each cylinder until a predefined unsmooth running limiting value is reached, and the variable valve train is controlled taking into account the cylinder-specific values for the reduction in the fuel quantity at the first operating point.

In a further embodiment, at a second operating point of the internal combustion engine the fuel quantity which is fed in in each case is reduced successively for each cylinder until a predefined further unsmooth running limiting value is reached, wherein an operating parameter of the valve train which influences the charging of the cylinders is smaller at the first operating point than at the second operating point, and the variable valve train is additionally controlled taking into account the cylinder-specific values for the reduction in the fuel quantity at the second operating point.

In a further embodiment, the first operating point is selected in such a way that faults during the supply of fuel have a smaller influence on the torque which is produced on a cylinder-specific basis than faults during the supply of fresh air into the cylinders, and the second operating point is selected such that faults during the supply of fuel have a larger influence on the torque which is produced on a cylinder-specific basis than faults during the supply of fresh air into the cylinders.

In a further embodiment, cylinder-specific faults during the supply of fuel are determined on the basis of the cylinder-specific values for the reduction in the fuel quantity at the second operating point and a predefined reference value, and the cylinder-specific faults are taken into account during the supply of fuel during the determination of the cylinder-specific values of the reduction in the fuel quantity at the first operating point.

In a further embodiment, the valve train of the internal combustion engine is designed to control the inlet valves of the internal combustion engine on a cylinder-specific basis, and the valve train is controlled in such a way that the cylinder-specific values for the reduction in the fuel quantity are approximated to one another at the first operating point.

In a further embodiment, the valve train of the internal combustion engine is designed to perform joint control of the inlet valves of the internal combustion engine wherein cylinder-specific faults during the charging of the cylinders are determined on the basis of the determined cylinder-specific values for the reduction in the fuel quantity at the first operating point and a corresponding predefined further reference value, and at least one control variable of the valve train is determined as a function of a comparison of the cylinder-specific faults during the charging of the cylinders with a comparison value.

In a further embodiment, the control variable is the stroke of the inlet valves which is the minimum which can be set by the valve train, or the opening time of the inlet valves which is the minimum which can be set by the valve train.

In a further embodiment, the cylinder-specific faults during the charging of the cylinders are taken into account during the cylinder-specific supply of fuel.

In a further embodiment, the fuel quantity which is fed in is increased for at least one of the cylinders at which the fuel quantity is currently not reduced.

Another embodiment provides a control device for an internal combustion engine having a plurality of cylinders, which control device is designed and provided with means such that it can carry out any of the methods disclosed above.

BRIEF DESCRIPTION OF THE DRAWINGS

Example embodiments of the invention are discussed below with reference to the drawings, in which.

DETAILED DESCRIPTION

Embodiments of the present disclosure provide a method and a device for controlling a variable valve train of an internal combustion engine having a plurality of cylinders by means of which the potential of these internal combustion engines to save fuel can be used better while maintaining the driving comfort.

Some embodiments provide a method for controlling a variable valve train of an internal combustion engine having a plurality of cylinders. Accordingly, at a first operating point of the internal combustion engine the fuel quantity which is fed in in each case is reduced successively for each cylinder (starting from a value for the fuel quantity which is fed in in each case which is common to all the cylinders) until a predefined unsmooth running limiting value is reached. The variable valve train is controlled taking into account the cylinder-specific values for the reduction in the fuel quantity at the first operating point.

Cylinder-specific faults during the charging of the cylinders are due, in particular, to fabrication-related tolerances of the valve train (valve control mechanism) and of the valves themselves. An aspect of the present invention is to determine qualitatively and quantitatively the cylinder-specific faults during the charging of fresh air by reducing the fuel quantity which is fed in on a cylinder-specific basis, until an unsmooth running limiting value is reached. In this context, the cylinder-specific values of the reduction in the fuel quantity constitute a measure of the charging of the cylinders with fresh air. By taking into account these cylinder-specific values, the variable valve train can be controlled to an optimum degree with respect to the driving comfort and the fuel consumption.

In one embodiment, at a second operating point of the internal combustion engine the fuel quantity which is fed in in each case is reduced successively for each cylinder (starting from a value for the fuel quantity which is fed in in each case which is common to all the cylinders) until a predefined further unsmooth running limiting value is reached. In this context, an operating parameter of the valve train which influences the charging of the cylinders is smaller at the first operating point than at the second operating point. The variable valve train is additionally controlled taking into account the cylinder-specific values for the reduction in the fuel quantity at the second operating point.

According to one embodiment, the first operating point is selected in such a way that faults during the supply of fuel have a smaller influence on the torque which is produced on a cylinder-specific basis than inaccuracies during the supply of fresh air into the cylinders. In addition, the second operating point is selected such that faults during the supply of fuel have a larger influence on the torque which is produced on a cylinder-specific basis than faults during the supply of fresh air.

In one embodiment, cylinder-specific faults during the supply of fuel are determined on the basis of the cylinder-specific values for the reduction in the fuel quantity at the second operating point and a predefined reference value. These faults are taken into account during the determination of the cylinder-specific values of the reduction in the fuel quantity at the first operating point.

Since the fuel quantity which is fed in is reduced during the charging of the cylinders in order to determine the faults quantitatively and qualitatively, fabrication-related tolerances of the fuel supply system, in particular of the injection valves, have an influence on the accuracy of the method. In order to quantify these faults as precisely as possible during the supply of fuel, at a second operating point the fuel quantities which are fed in on a cylinder-specific basis are reduced until a further limiting value for the unsmooth running is reached. The cylinder-specific values of this reduction in the fuel quantity are then compared with a suitable reference value. The reference value may be, for example, a mean value of the values of the reduction in the fuel quantity or a corresponding indication of the manufacturer of the fuel supply system. There is advantageously a cylinder-specific percentage error during the supplying of fuel, due to tolerances in the fuel supply system. These errors are then taken into account during the determination of the values of the reduction in the fuel quantity at the first operating point, which improves the accuracy of the method.

The second operating point is advantageously selected such that the influence of faults during the supply of fuel, due to cylinder-specific tolerances of the fuel supply system, on the torque which is produced on a cylinder-specific basis is predominant over the influence of faults during the charging with fresh air, due to cylinder-specific tolerances of the valve train.

The first operating point is advantageously to be selected such that the influence of faults during the supply of fuel, due to cylinder-specific tolerances of the fuel supply system, on the torque which is produced on a cylinder-specific basis is negligible compared to the influence of faults during the charging with fresh air, due to cylinder-specific tolerances of the valve train.

As a result, overlapping of the influences is largely avoided. For example, the inlet valves at the second operating point reach their maximum possible stroke and/or their maximum opening duration. In contrast, the strokes and/or the opening times of the inlet valves at the first operating point are rather low. This is due to the fact that the influence of faults on the torque during the charging of the cylinders due to tolerances in the valve train decreases as the charging of the cylinders increases, while the influence of faults on the torque during the supply of fuel increases as the charging of the cylinders increases.

In one embodiment, the valve train of the internal combustion engine is designed to control the inlet valves of the internal combustion engine on a cylinder-specific basis. The valve train is controlled in such a way that the cylinder-specific values for the reduction in the fuel quantity are approximated to one another at the first operating point.

The valve train for the cylinder-specific control of the inlet valves may have, for example, an electromagnetic or pneumatic mechanism. With such known mechanisms, the stroke and/or the valve control times can be varied on a cylinder-specific basis. Given knowledge of the cylinder-specific values for the reduction in the fuel quantity, which values constitute a measure of the cylinder-specific charging with fresh air, the valve train can be actuated in such a way that these values for the reduction in fuel quantity are approximated to one another. As a result, it is possible to equalize the torques produced in the cylinders.

In one embodiment, the valve train of the internal combustion engine is designed to perform joint control of the inlet valves of the internal combustion engine. Cylinder-specific faults during the charging of the cylinders are determined on the basis of the cylinder-specific values for the reduction in the fuel quantity at the first operating point and a corresponding predefined further reference value. At least one control variable of the valve train is determined as a function of a comparison of the cylinder-specific faults with a predefined comparison value.

According to one embodiment, the control variable is the stroke of the inlet valves which is the minimum which can be set by the valve train or the opening time of the inlet valves which is the minimum which can be set by the valve train.

The further reference value may be, for example, an average value of the values of the reduction in the fuel quantity or may be a corresponding indication of the manufacturer for the first operating point. The cylinder-specific values of the reduction in the fuel quantity may be related, for example, to the reference value, with the result that a cylinder-specific percentage error occurs during the charging of the cylinders, due to tolerances in the valve train. The cylinder-specific faults during the charging of the cylinders are then compared with a comparison value which can also be supplied by the manufacturer of the valve train. The comparison value constitutes a measure of the fault which is based on tolerances during the charging of the cylinders for a reference valve train which is measured by the manufacturer. This can advantageously be a percentage fault indication. The reference value can refer to the valve stroke, to the valve opening times or to other operating parameters of the valve train which influence the charging of the cylinders. If the comparison reveals that the cylinder-specific faults during the charging of the cylinders for the valve train in question are lower than the predefined comparison value, permitting more precise setting of the charging of the cylinders, it is possible, for example, to reduce a minimum stroke or a minimum opening period for the variable valve train. As a result, the operating range which is optimum for consumption can be extended in the case of low loads and in the idling mode. However, if it proves that the cylinder-specific faults during the charging of the cylinders are larger than the comparison value, so that the charging of the cylinders is set with less precision, the minimum stroke or the minimum opening period for the variable valve train can be increased in order to avoid adverse effects on the comfort in the lower load range and in the idling mode.

In one embodiment, the cylinder-specific faults during the charging of the cylinders are taken into account during the cylinder-specific supply of fuel.

In this way, a negative influence of the deviations during the charging of the cylinders on the composition of the exhaust gas and on the torques which are produced on a cylinder-specific basis can be compensated.

In one embodiment, the fuel quantity which is fed in is increased at least at one of the cylinders at which the fuel quantity for determining the deviation of the charging of the cylinders is currently not reduced.

The increasing of the fuel quantity in at least one cylinder compensates the reduction in the torque which is caused in another cylinder owing to the lean adjustment. At the same time, negative effects on the exhaust gas can be avoided. It is therefore possible to dimension the increase in the fuel quantity which is fed in in such a way that the global composition of the exhaust gas is lambda=1 despite the lean adjustment in another of the cylinders.

A control device for an internal combustion engine having a plurality of cylinders is designed and provided with means such that it can carry out any of the methods disclosed herein.

Figure 1:
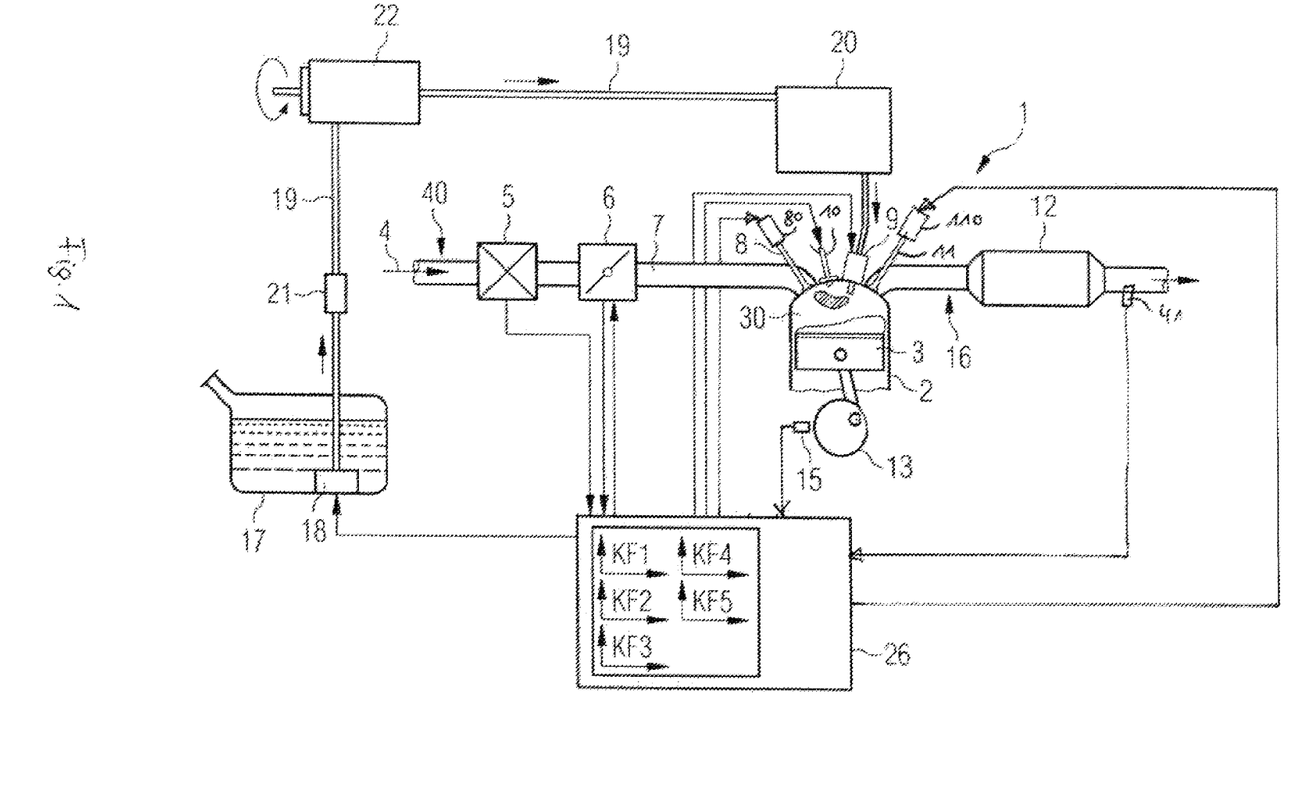
FIG. 1 shows a schematic illustration of an internal combustion engine.

FIG. 1 is a schematic illustration of an internal combustion engine 1.

The internal combustion engine 1 comprises four cylinders 2, wherein for reasons of better clarity just one cylinder is illustrated. The description which is directed at this cylinder applies analogously to the other cylinders. Arranged in the cylinder 2 is a piston 3 which can move up and down in the cylinder 2. The internal combustion engine 1 also comprises an intake section 40 in which an air mass flow rate sensor 5, a throttle valve 6 and an intake manifold 7 are arranged downstream of an intake opening 4 for sucking in fresh air. The intake section 40 opens into a combustion chamber 30 which is bounded by the cylinder 2 and the piston 3. The fresh air which is necessary for combustion is introduced into the combustion chamber 30 via the intake section 40, wherein the supply of fresh air is controlled by opening and closing at least one inlet valve 8.

The internal combustion engine 1 illustrated here is an internal combustion engine 1 with direct fuel injection, wherein the fuel necessary for the combustion is injected directly into the combustion chamber 30 via an injection valve 9 (electromagnetic or piezeoelectric). A spark plug 10 which also projects into the combustion chamber 30 serves to trigger the combustion. The combustion exhaust gases are conducted away into an exhaust gas section 16 of the internal combustion engine 1 via an outlet valve 11 and are purified by means of an exhaust gas catalytic converter 12. In addition, a lambda sensor 41 for sensing the oxygen content of the exhaust gas is arranged in the exhaust gas section.

The internal combustion engine has a valve train 80 for performing variable control of the inlet valves 8. The internal combustion engine can also have a valve train 110 for performing variable control of the outlet valves 11 (but this configuration is not considered below). The valve train 80 can be designed to perform cylinder-specific or joint control of the inlet valves 8. For this purpose, the valve train 80 can have an electromagnetic, electric or pneumatic mechanism. The valve train 80 can vary here at least one operating parameter of the inlet valves which influences the charging of the cylinders, for example the stroke and/or the valve opening times of the inlet valves 80.

The force is transmitted to a drive train of the motor vehicle (not illustrated) via a crankshaft 13 which is coupled to the piston 3. The internal combustion engine 1 also has an integrated crankshaft sensor 15 for sensing the position and rotational speed of the crankshaft 13.

The internal combustion engine 1 has a fuel supply system which has a fuel tank 17 and a fuel pump 18 arranged therein. The fuel is fed to a pressure accumulator 20 via a supply line 19 by means of the fuel pump 18. The pressure accumulator 20 is a common one from which the injection valves 9 for a plurality of cylinders 2 are supplied with pressurized fuel. In addition, a fuel filter 21 and a high pressure pump 22 are arranged in the supply line 19. The high pressure pump 22 is used to feed the fuel, fed by the fuel pump 18 at relatively low pressure (approximately 3-5 bar), to the pressure accumulator 20 at high pressure (typically in the order of magnitude of 120-150 bar).

The internal combustion engine 1 is assigned a control device 26 which is connected via signal lines and data lines (illustrated by arrows in FIG. 1) to all of the actuators and sensors of the internal combustion engine 1. Characteristic-diagram-based control functions (KF1 to KF5) are implemented on a software basis in the control device 26. For this purpose, the control device has a data memory and a microprocessor (not illustrated). Control signals are output to the actuators of the internal combustion engine 1 and of the fuel supply system on the basis of the measured values of the sensors and the characteristic-diagram-based engine control functions. Specifically, the control device 26 is coupled via data and signal lines to the fuel pump 18, the air mass flow rate sensor 5, the throttle valve 6, the spark plug 10, the injection valves 9, the variable valve train 80 (if appropriate also to the valve train 110), the crankshaft sensor 15 and the lambda sensor 41.

Figure 2A:
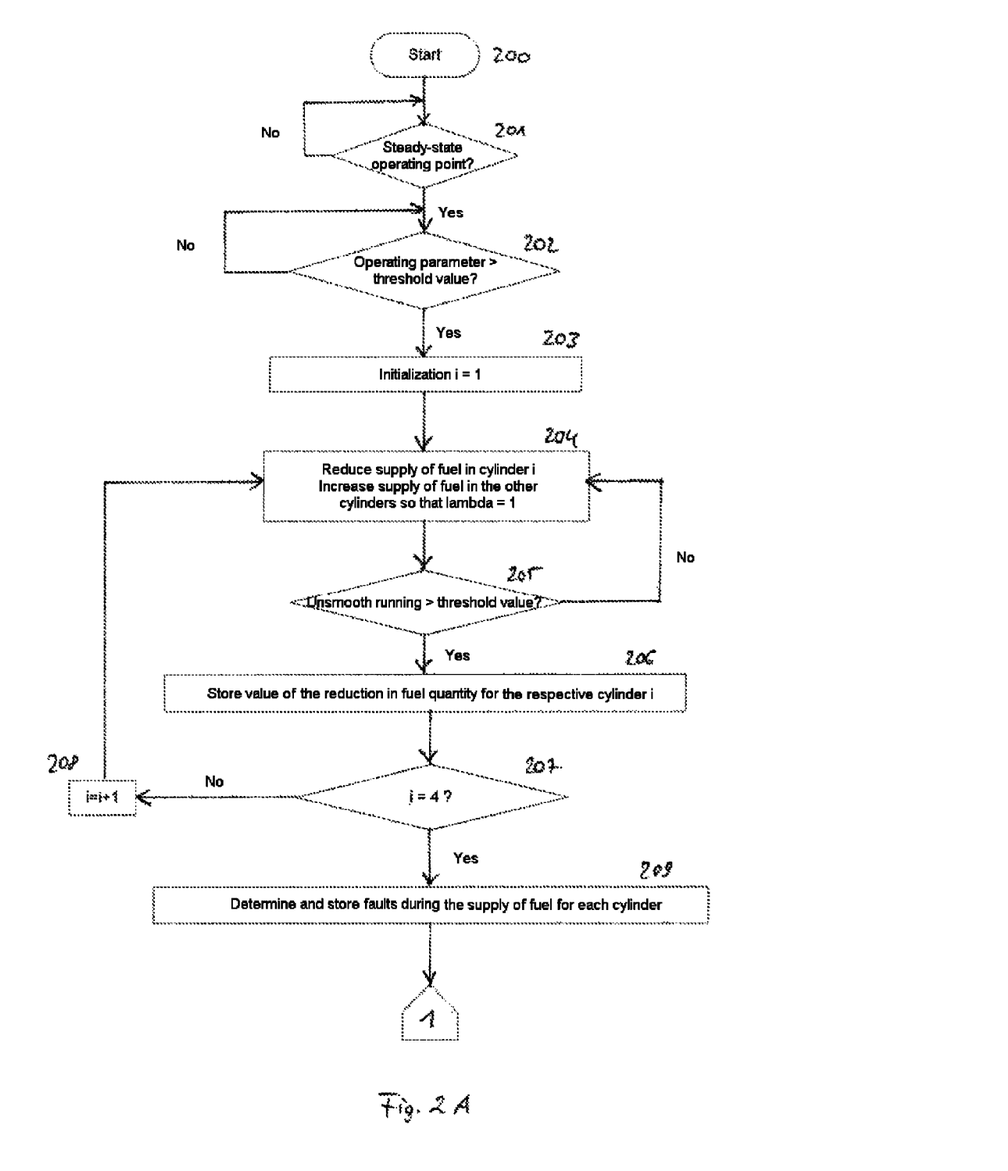
FIGS. 2A and 2B show an exemplary embodiment of a control method in the form of a flowchart.
Figure 2B:
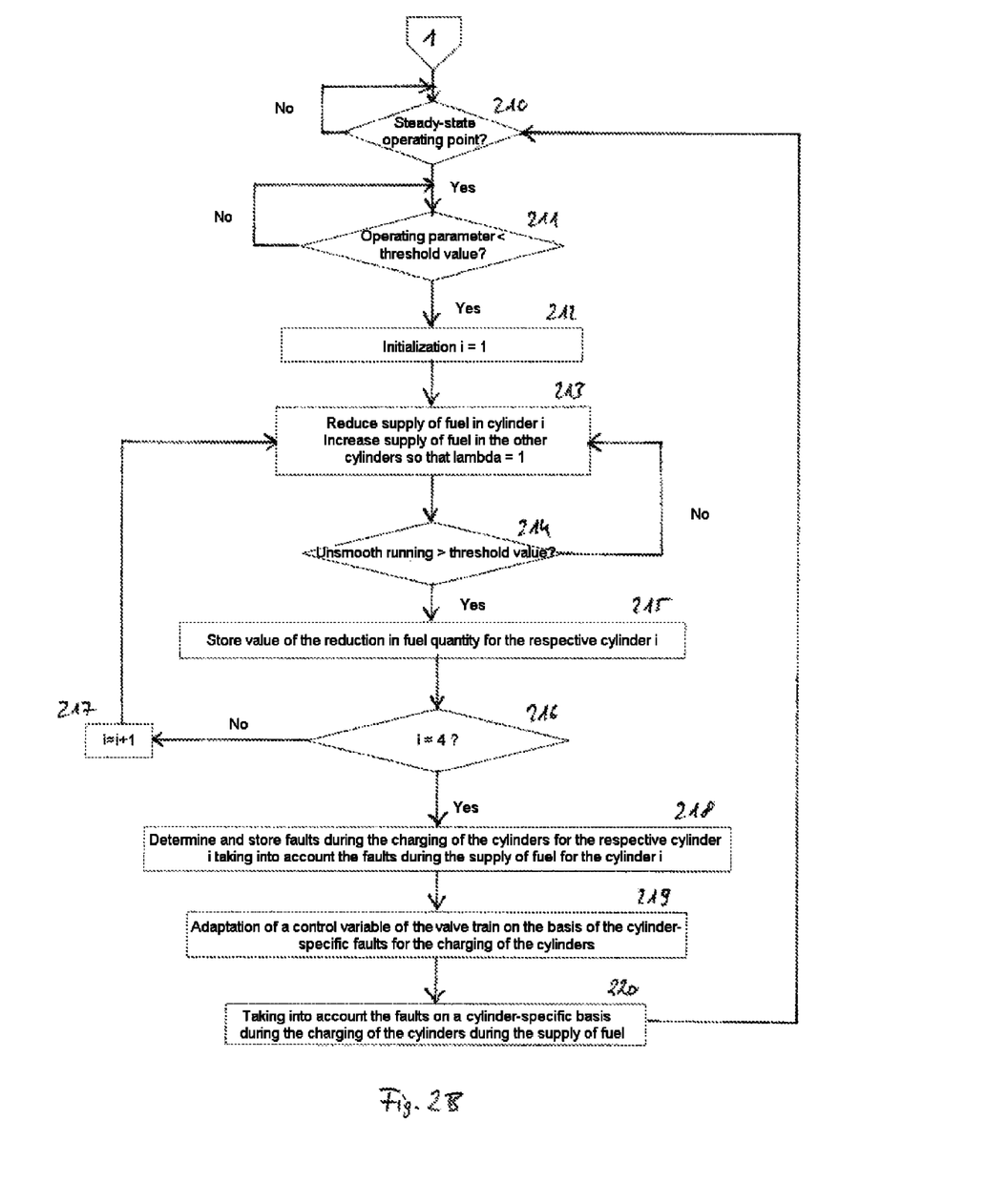

The control device 26 is designed to generate control signals for opening and closing the injection valve 9. The control signals are transmitted to the electromagnetic or piezoelectric actuators of the injection valves 9 via the corresponding signal lines (characterized by arrows in FIG. 1). The control device 26 is also designed to control the valve train 80 (if appropriate also the valve train 110) in order in this way to vary the operating parameters of the valve train 80 which influence the charging of the cylinders. The control device is designed in such a way that it can carry out the disclosed control method for the valve train 80 (11), as is described, for example, on the basis of FIG. 2.

FIG. 2 illustrates an exemplary embodiment of a method for controlling the variable valve train of an internal combustion engine having a plurality of cylinders such as is illustrated, for example, in FIG. 1, in the form of a flowchart.

The method is carried out by means of the control functions implemented in the control device 26.

The method starts with step 200, for example when the internal combustion engine 1 is started by a vehicle driver (not illustrated). From the start, the rotational speed and the air mass flow rate are measured continuously via the crankshaft sensor 15 or the air mass flow rate sensor 5.

The method continues with step 201 in which it is checked whether a steady-state operating point of the internal combustion engine 1 is present. For this purpose it is possible to check, for example, whether the rotational speed and the air mass flow rate which are fed in are within predefined value windows over a predefined time period. This interrogation is repeated until a steady-state operating point is detected.

Subsequently, the method continues with step 202 in which it is checked whether an operating parameter, influencing the charging of the cylinders, of the valve train 80 is greater than a predefined threshold value. The operating parameter may be, for example, the valve stroke or the valve opening time of the inlet valve 8. The interrogation is repeated until the condition in step 202 is satisfied. In the event of a positive result of the interrogation in step 202, the internal combustion engine is therefore operated at a steady-state operating point, wherein the operating parameter, influencing the charging of the cylinders, of the valve train is greater than a predefined threshold value. This operating point is referred to below as the second operating point. The threshold value for the operating parameter of the valve train is to be dimensioned here in such a way that at the second operating point the influence of faults during the supply of fuel, due to cylinder-specific tolerances of the fuel supply system, on the torque produced on the cylinder-specific basis is predominant over the influence of faults during the charging with fresh air, due to cylinder-specific tolerances of the valve train. As a result, overlapping of the influences is largely avoided. For example, the inlet valves 8 reach their maximum possible stroke and/or their maximum operating duration at the second operating point.

The method continues with step 203 in which a counting variable i, which can assume integral values between 1 and the number of cylinders of the internal combustion engine, is initialized with the value 1. In the exemplary embodiment, the counting variable i can therefore assume integral values between 1 and 4.

The method continues with step 204 in which the fuel quantity which is fed into the cylinder i is reduced by a specific absolute value. For this purpose, the injection valve 9 which is assigned to the respective cylinder i is correspondingly actuated by the control device, for example in that the opening time of the injection valve is reduced by correspondingly shortened energization.

At the same time, in at least one of the other cylinders 2 the fuel quantity can be advantageously increased until the global composition of the exhaust gas which is sensed by the lambda sensor 41 does not change and, for example, remains at lambda=1.

The method continues with step 205 in which it is checked whether a change in torque due to the reduction in the fuel quantity in cylinder i leads to unsmooth running which is greater than a predefined threshold value. The threshold value for the unsmooth running is to be predefined here in such a way that no unacceptable adverse effects on comfort are produced for the driver. The unsmooth running is determined here on the basis of fluctuations in the rotational speed which are sensed synchronously with respect to segments by the crankshaft sensor 15, and are therefore assigned precisely to each cylinder. The method step 204 is repeated until the interrogation in step 205 can be given a positive response.

The method then continues with step 206 at which the value of the reduction in the fuel quantity for the respective cylinder 2 is stored until the threshold value for the unsmooth running is exceeded.

The method continues with step 207 in which it is checked whether the counter i has already reached the number of cylinders of the internal combustion engine. If this is not the case, the counting variable i is incremented by 1. The method steps 204 to 208 are therefore carried out for each of the cylinders of the internal combustion engine, with the result that at the end the respective value of the reduction in fuel quantity until the threshold value for the unsmooth running is reached is stored for each cylinder.

In the event of a positive result of the interrogation in step 207, the method continues with step 209 in which for each cylinder a fault is determined and stored during the supply of fuel on the basis of the respective cylinder-specific value for the reduction in the fuel quantity and a predefined reference value.

The reference value can be, for example, the arithmetic mean value of the cylinder-specific values of the reduction in the fuel quantity at the second operating point or a corresponding indication by the manufacturer of the fuel supply system. The cylinder-specific faults during the supply of fuel for the respective cylinder can be formed, for example, on the basis of the quotient of the respective cylinder-specific value of the reduction in fuel quantity and the reference value. As a result, a cylinder-specific percentage fault during the supply of fuel, due to tolerances in the fuel supply system, is advantageously obtained.

These cylinder-specific faults during the supply of fuel reflect fabrication-related or aging-related inaccuracies during the supply of fuel for each cylinder. The faults during the supply of fuel are therefore based on tolerances of the injection valves. The determination of these cylinder-specific faults during the supply of fuel serve to improve the accuracy of the entire method, as becomes clear in the following statements.

The method continues with step 210 in which it is in turn checked whether the internal combustion engine 1 is at a steady-state operating point. With respect to the accurate execution of this interrogation, reference is made to the explanation regarding step 201. The interrogation is repeated until a steady-state operating point is detected. The method continues with step 211 in which it is checked whether an operating parameter of the valve train is smaller than a predefined threshold value. The operating parameter of the valve train influences the charging of the cylinders, so that said parameter is, for example, the stroke or the opening time of the inlet valve 8. The threshold value for the operating parameter of the valve train is to be dimensioned here in such a way that the influence of faults during the charging of the cylinders, due to cylinder-specific tolerances of the valve train 80, on the torque which is produced on a cylinder-specific basis, is predominant over the influence of faults during the supply of fuel, due to cylinder-specific tolerances of the fuel supply system. As a result, overlapping of the influences is largely avoided. The interrogation in step 211 is repeated until a positive result occurs. In the event of a positive result of the interrogation in step 211, the internal combustion engine is therefore operated at a steady-state operating point, wherein the operating parameter, influencing the charging of the cylinders, of the valve train is smaller than a predefined threshold value. This operating point is referred to below as the first operating point.

The steps 212 to 217, which occur in the same way as the steps 203 to 208, now follow. With respect to the precise procedure, reference is made to the statements regarding steps 203 to 218.

In the event of a positive result of the interrogation in step 216, the method continues with step 218 in which a fault during the charging of the cylinders is determined and stored for each cylinder taking into account the faults during the supply of fuel which are determined in step 209. For this purpose, the cylinder-specific values, determined in step 215, for the reduction in the fuel quantity at the first operating point are firstly corrected by the cylinder-specific faults during the supply of fuel which are determined in step 209. This correction brings about an increase in the accuracy of the method since the cylinder-specific faults during the supply of fuel are due to fabrication-related tolerances of the injection valves and not to fabrication-related tolerances of the valve train. The corrected cylinder-specific values for the reduction in the fuel quantity at the first operating point are then related to a further reference value in order in this way to obtain the cylinder-specific percentage error during the charging of the cylinders.

The further reference value may be, for example, a mean value of the values of the reduction in the fuel quantity at the first operating point or a corresponding indication of the manufacturer for the first operating point.

The method continues with step 219 in which at least one control variable of the valve train 8 is adapted based on the cylinder-specific faults during the charging of the cylinders.

If the valve train 80 is designed to perform cylinder-specific control of the inlet valves 8, the at least one control variable (for example stroke or opening time of the inlet valve 8) can be adapted in such a way that the cylinder-specific faults are approximated or equalized or minimized during the charging of the cylinders at the first operating point. As a result, uniform and precise charging of the cylinders can be achieved. An analogous procedure is also already possible after the determination of the cylinder-specific values for the reduction in the fuel quantity at the first operating point (transition to step 218). In this context, the at least one control variable can be adapted in such a way that the values for the reduction in the fuel quantity at the first operating point are approximated or equalized.

If the valve train is designed to perform joint control of the inlet valves 2, the cylinder-specific faults during the charging of the cylinders are compared with a comparison value which can also be supplied by the manufacturer of the valve train. The comparison value constitutes a measure of the fault, due to tolerances, during the charging of the cylinders for a reference valve train which is measured by the manufacturer. This may advantageously be a percentage fault indication. The comparison value can relate to the valve stroke, to the valve opening times or to other operating parameters of the valve train which influence the charging of the cylinders. If the comparison reveals that the cylinder-specific faults during the charging of the cylinders for the present valve train are smaller than the predefined comparison value, and therefore that more precise setting of the charging of the cylinders is possible, for example a minimum stroke or a minimum operating duration for the variable valve train can therefore be reduced. As a result, the operating range which is optimum for consumption can be extended in the case of low loads and in the idling mode. However, if it becomes apparent that the cylinder-specific faults during the charging of the cylinders are greater than the comparison value, and the charging of the cylinders is therefore set less precisely, the minimum stroke or the minimum opening duration can be increased for the variable valve train in order to avoid adverse effects on comfort in the lower load range and in the idling mode.

The method continues with step 220 in which the cylinder-specific faults are taken into account during the charging of the cylinders during the supply of fuel. If, for example, it is detected that owing to fabrication-related tolerances at the valve train 10% more charging of the cylinders occurs, the fuel quantity which is fed in by the respective injection valve is correspondingly increased. As a result, the cylinder-specific exhaust gas values can be optimized.

The method can be repeated at this point starting from step 210 for another operating point. After many passes for different operating points, the valve train is optimized for a further operating range.

Although the invention has been explained for an internal combustion engine with direct fuel injection, explicit reference is made to the fact that the invention is not restricted to internal combustion engines with direct fuel injection. The invention can also be applied to internal combustion engines with intake manifold injection in which the supply of fuel can be controlled on a cylinder-specific basis. This is possible, for example, in the case of an internal combustion engine in whose intake manifold one injection valve is arranged per cylinder. The invention can be transferred analogously to such an internal combustion engine with intake manifold injection.

What is claimed is:

1. A method for controlling a variable valve train of an internal combustion engine having a plurality of cylinders, comprising:
    at a first operating point of the internal combustion engine, successively reducing a fuel quantity fed in for each cylinder until a predefined unsmooth running limiting value is reached,
    for each cylinder, determining a cylinder-specific value for the reduction in the fuel quantity at the first operating point based on the determined fuel quantity reduction that achieves the predefined unsmooth running limiting value, and
    controlling the variable valve train based on the determined cylinder-specific values for the reduction in the fuel quantity at the first operating point.

2. The method of claim 1, comprising:
    at a second operating point of the internal combustion engine, successively reducing a fuel quantity fed in for each cylinder until a further predefined unsmooth running limiting value is reached,
    wherein an operating parameter of the valve train that influences charging of the cylinders is smaller at the first operating point than at the second operating point, and
    controlling the variable valve train based on cylinder-specific values for the reduction in the fuel quantity at the second operating point.

3. The method of claim 2, comprising:
    selecting the first operating point such that faults during a supply of fuel have a smaller influence on the torque produced on a cylinder-specific basis than faults during a supply of fresh air into the cylinders, and selecting the second operating point such that faults during the supply of fuel have a larger influence on the torque which is produced on a cylinder-specific basis than faults during the supply of fresh air into the cylinders.

4. The method of claim 2, comprising:
determining cylinder-specific faults during a supply of fuel based on the cylinder-specific values for the reduction in the fuel quantity at the second operating point and a predefined reference value, and
determining the cylinder-specific values for the reduction in the fuel quantity at the first operating point based on (a) the determined fuel quantity reduction that achieves the predefined unsmooth running limiting value and (b) the determined cylinder-specific faults.

5. The method of claim 1, wherein the valve train is configured to control inlet valves of the internal combustion engine on a cylinder-specific basis, and the method comprisies controlling the valve train such that the cylinder-specific values for the reduction in the fuel quantity are approximated to one another at the first operating point.

6. The method of claim 1, wherein the valve train is configured to perform joint control of the inlet valves of the internal combustion engine, and the method comprises:
determining cylinder-specific faults during a charging of the cylinders based on the determined cylinder-specific values for the reduction in the fuel quantity at the first operating point and a corresponding predefined further reference value, and
determining at least one control variable of the valve train as a function of a comparison of the cylinder-specific faults during the charging of the cylinders with a comparison value.

7. The method of claim 6, wherein the at least one control variable comprises at least one of (a) a minimum stroke of the inlet valves that can be set by the valve train, and (b) a minimum opening time of the inlet valves that can be set by the valve train.

8. The method of claim 6, wherein the cylinder-specific faults during the charging of the cylinders are taken into account during the cylinder-specific supply of fuel.

9. The method of claim 1, comprising increasing the fuel quantity fed in for at least one of the cylinders at which the fuel quantity is currently not reduced.

10. A control device for an internal combustion engine having a plurality of cylinders, the control device comprising logic instructions stored in non-transitory computer-readable media and executable by a processor to:
at a first operating point of the internal combustion engine, successively reduce a fuel quantity fed in for each cylinder until a predefined unsmooth running limiting value is reached,
for each cylinder, determine a cylinder-specific value for the reduction in the fuel quantity at the first operating point based on the determined fuel quantity reduction that achieves the predefined unsmooth running limiting value, and
control the variable valve train based on the determined cylinder-specific values for the reduction in the fuel quantity at the first operating point.

11. The control device of claim 10, configured to:
at a second operating point of the internal combustion engine, successively reduce a fuel quantity fed in for each cylinder until a further predefined unsmooth running limiting value is reached,
wherein an operating parameter of the valve train that influences charging of the cylinders is smaller at the first operating point than at the second operating point, and
control the variable valve train based on cylinder-specific values for the reduction in the fuel quantity at the second operating point.

12. The control device of claim 11, configured to:
select the first operating point such that faults during a supply of fuel have a smaller influence on the torque produced on a cylinder-specific basis than faults during a supply of fresh air into the cylinders, and select the second operating point such that faults during the supply of fuel have a larger influence on the torque which is produced on a cylinder-specific basis than faults during the supply of fresh air into the cylinders.

13. The control device of claim 11, configured to:
determine cylinder-specific faults during a supply of fuel based on the cylinder-specific values for the reduction in the fuel quantity at the second operating point and a predefined reference value, and
determine the cylinder-specific values for the reduction in the fuel quantity at the first operating point based on (a) the determined fuel quantity reduction that achieves the predefined unsmooth running limiting value and (b) the determined cylinder-specific faults.

14. The control device of claim 10, configured to control a valve train of the 1 combustion engine such that the cylinder-specific values for the reduction in the fuel quantity are approximated to one another at the first operating point.

15. The control device of claim 10, configured to:
determine cylinder-specific faults during a charging of the cylinders based on the determined cylinder-specific values for the reduction in the fuel quantity at the first operating point and a corresponding predefined further reference value, and
determine at least one control variable of the valve train as a function of a comparison of the cylinder-specific faults during the charging of the cylinders with a comparison value.

16. The control device of claim 15, wherein the at least one control variable comprises at least one of (a) a minimum stroke of the inlet valves that can be set by the valve train and (b) a minimum opening time of the inlet valves that can be set by the valve train.

17. The control device of claim 15, configured to account for the cylinder-specific faults during the charging of the cylinders during the cylinder-specific supply of fuel.

18. The control device of claim 10, configured to increase the fuel quantity fed in for at least one of the cylinders at which the fuel quantity is currently not reduced.

* * * * *